Feb. 4, 1958  M. M. MAYHEW  2,821,998
ROTARY SELECTOR VALVE
Filed Jan. 27, 1956  2 Sheets-Sheet 1

MYRON M. MAYHEW
INVENTOR.

BY Lynn H Latta
ATTORNEY

Feb. 4, 1958
M. M. MAYHEW
2,821,998
ROTARY SELECTOR VALVE
Filed Jan. 27, 1956
2 Sheets-Sheet 2
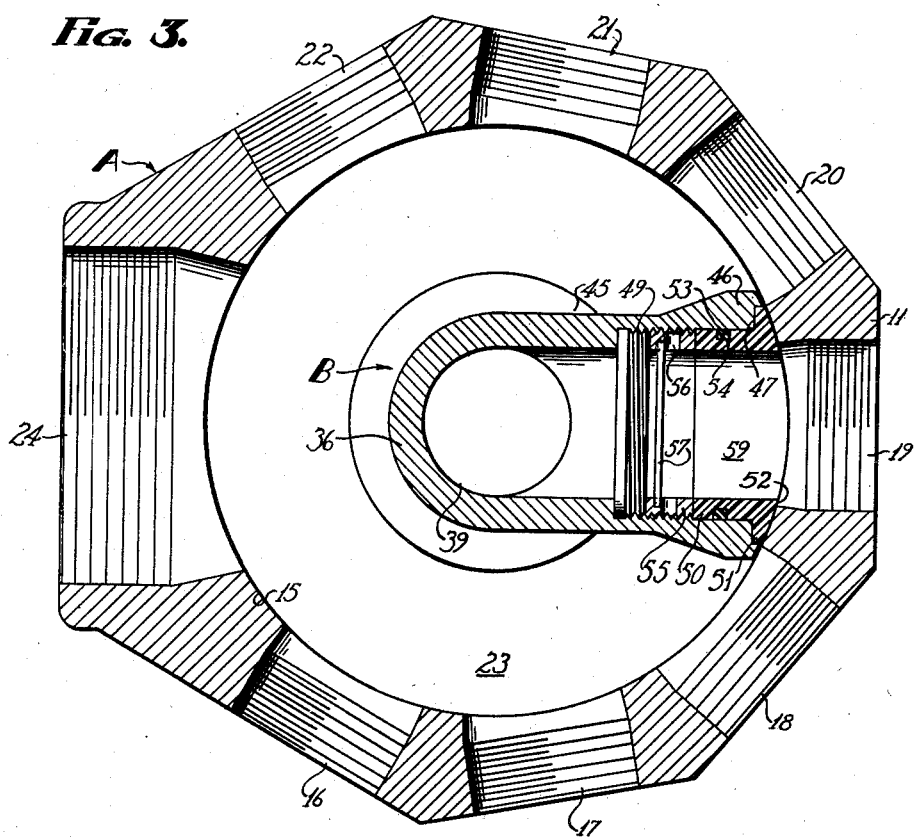
MYRON M. MAYHEW
INVENTOR.
BY Lynn H. Latta
ATTORNEY

United States Patent Office 2,821,998
Patented Feb. 4, 1958

2,821,998

ROTARY SELECTOR VALVE

Myron M. Mayhew, Los Angeles, Calif., assignor, by mesne assignments, to Win-Well Manufacturing Company, a corporation of Delaware Application January 27, 1956, Serial No. 561,814

9 Claims. (Cl. 137—625.11)

This invention relates to rotary selector valves and more particularly to a rotary valve adapted to gather and merge the inflows from a plurality of fluid lines and to direct them to a common service outlet while simultaneously directing the inflow from an additional line to a separate outlet, maintaining that flow segregated from the flow to the common outlet, thus providing for selectively sampling the fluid from any of the input lines in order to determine the characteristics thereof (e. g. rate of flow, quality, amount of foreign material carried therein, or any other condition to be observed).

One of the primary objects of the invention is to provide a selector valve for use under conditions wherein the mating surfaces of the valve are subjected to difficult conditions of wear such as are encountered in the handling of crude oil flowing from a series of oil wells, and a major object of this invention is to provide a valve that will retain good operating characteristics throughout extended periods of service under such adverse conditions.

In particular, the invention contemplates an improved rotary selector valve having bearing surfaces utilizing a tough resinous plastic material having inordinately high wearing qualities and being capable of cold flowing into close mating contact with casing and rotor members to prevent fluid seepage between the mating surfaces. The invention further involves the discovery, in extended field tests, of an extremely improved ability (as contrasted to that of valves available in the prior art) to maintain adequate fluid tightness over long periods of service, in the presence of adverse conditions tending to cause wear, and in spite of recurrent changes in conditions such as temperature, fluid pressure, etc.

As used in the petroleum industry, the selector valve of my invention serves as a means to bring together a plurality of flows from a number of supply lines (e. g. lines coming from a series of different oil wells) and directing such flows through a relatively large service outlet to a storage tank. In petroleum producing operations, it is desirable to know the amount and qualities of production from the various wells of a group, the joint output of which is delivered to a common transfer line leading to a storage tank or the like, and heretofore it has been customary to provide in the respective incoming lines, manifolds having bypass valves by means of which the flow of any one of such incoming lines may be diverted from the common transfer line and directed to sampling and testing equipment.

When a product sample from a particular source was desired, it was necessary to shut off the fluid flow within the corresponding supply line, disconnect the line at the manifold and connect it to a secondary conduit leading to the sampling and testing equipment, then repeat the procedure in reverse sequence to reconnect the line to the manifold.

Certain selector valves have been used during recent years to perform the general function of the former manifold and, at the same time, eliminate the awkward and highly inefficient procedure formerly required to obtain test samples from each of a number of sources.

However, the handling of a heavy fluid, such as crude oil, under generally high line pressures is most difficult and the selector valves presently available for this purpose are found to be inefficient and generally incapable of meeting the exacting requirements of actual use. Even when first installed, some of them fail to completely segregate the product being diverted for sampling from the fluids in the other supply lines, and dilution and contamination occurs depending upon pumping pressures developed in the supply lines.

But even more important than the problems of seepage and siphoning due to variations in differential pressures, is that of interstitial leakage between the valve parts due to wear on their bearing surfaces. Unless the valves are frequently disassembled and carefully inspected for indications of excessive wear, discrepancies in samples taken and particularly in rate of flow checks are bound to occur for long periods of time before the presence of error due to faulty valve operation is even suspected.

With the foregoing and other considerations in mind, the present invention will be seen to have a number of objects.

One important object of this invention is the provision of a rotary selector valve in which interstitial fluid tightness is assured by the use of self-conforming bearing members adapted to cold flow into close juxtaposition with adjacent surfaces.

Another important object of this invention is the provision of a rotary selector valve with bearings having inherent self-conformability as previously described and which are further adapted to cooperate with readily compressible sealing members which are expandable and adjustable to compensate for possible wear.

A further important object of this invention is the provision of a rotary selector valve provided with separate bearing members and seals interfitted between its housing and rotor, and adapted to absorb a maximum share of the wear that does occur.

Another important object of this invention is the provision of a rotary selector valve having interfitting bearing members and seals, as described above, which may be easily removed and replaced when evidence of wear becomes apparent.

Another object of this invention is the provision of a rotary selector valve having replaceable bearing and sealing members and having one of such bearing members positioned in the complete valve assembly at a point at which the effects of wear upon it may be observed from the outside of the valve housing.

A still further important object of this invention is the provision of a rotary selector valve having a housing body and a movable rotor therein relatively dimensioned to provide optimum freedom of fluid flow around the rotor from a series of inlet ports to a main outlet.

In brief, the rotary selector valve of the present invention may include a cylindrical chamber being somewhat less in depth than in diameter, closed at the bottom and having a fluid-tight cap plate removably attached across its top. Radially disposed around the chamber wall are a plurality of inlet ports to which fluid supply lines are connected, and a single large outlet port of sufficient size to receive the combined input of all of the supply lines is also apertured in the sidewall and is connected exteriorly to a main output conduit leading to the main storage tank. A generally hollow T-shaped rotor is axially disposed in the center of the chamber and is journalled with interfitting Teflon bushings in the cap and bottom of the chamber.

A short tubular extension of the journalled rotor body is extended laterally from the hollow center thereof so as to align radially of the chamber with the inlet ports in the chamber sidewall. Into the open end of this tubular extension is fitted a Teflon seal bushing having a flanged head provided with an arcuate outer surface mating with the concave contour of the inner periphery of the chamber. The tubular extension communicates with the hollow interior of the rotor thus forming an L-shaped fluid passage terminated in an output port centered in the bottom of the chamber housing and opening into a supply line leading to the sampling and testing equipment.

An actuator stem for turning the rotor member is extended above the chamber enabling an operator to turn the inlet port of the rotor member into alignment with any one of the supply line inlet ports thereby diverting its fluid product from its normal path of flow through the chamber into the main outlet port, and directing it instead through the fluid passage of the rotary member into the secondary outlet line and to the test equipment.

Fig. 3 is a transverse sectional view thereof taken on the line 3—3 of Figure 2; and Fig. 4 is a perspective view of the rotor unit of the valve.

Figure 1:
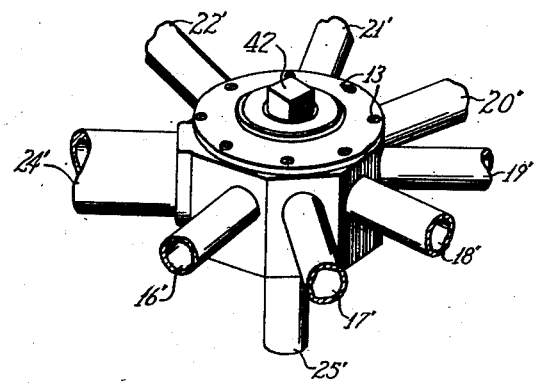
Fig. 1 is a perspective view of a selector valve embodying my invention.

Referring to the drawings now in detail, I have shown, as an example of one form in which the invention may be embodied, a rotary selector valve including, in general, a casing A and a rotor B. Casing A may include a main body section having a peripheral or lateral section 11, a bottom end section 10, and an opposed end section consisting in a separate cap 12 which is detachably attached to peripheral section 11 by any suitable means such as cap screws 13 (Fig. 1). Peripheral section 10 has an internal lateral wall 14, at least a portion of which consists in an accurately ground or otherwise machined or finished cylindrical wall 15. The axis of generation of cylindrical wall 15 is the rotary axis of the valve. A plurality of inlet ports 16, 17, 18, 19, 20, 21 and 22 open through cylindrical wall 15 into a valve chamber 23 that is defined within the casing A. A much larger port 24, functioning as a service outlet port, communicates with chamber 23 through lateral walls 14, 15. An axial port 25 extends through one of the end members 10 and 12 of the casing A, (being shown as extending downwardly through bottom end member 10) which may be enlarged into a boss 26 to provide ample axial length for port 25. Ports 16, 17, 18, 19, 20, 21, 22, 24 and 25 are preferably internally threaded, as shown, for connection thereto of inlet conduits 16', 17', 18', 19', 20', 21' and 22', and service line and sampling line outlet conduits 24' and 25' respectively. At this point, it may be pointed out that where the valve is used to handle the flows coming from a group of oil wells to a common delivery duct 24' leading to a storage tank, the valve is adapted to simultaneously gather and merge the incoming flows from conduits 16', 17' . . . 22' and deliver them to service outlet duct 24', with the exception of a selected one of the incoming lines which is segregated from the merging flows and connected separately to the sampling outlet line 25'. Thus, while the production of six of the wells connected to the valve is being merged and delivered through duct 24' to a storage tank, the flow from any selected one of the incoming lines may be separately directed through outlet conduit 25' to sampling or testing equipment. Furthermore, without interrupting the flow of liquid through the valve, the valve may be shifted so as to transfer the sampling connection to any other or all of the remaining incoming lines, in succession, while the flow from a line previously sampled, together with other incoming lines, is directed through the common service outlet 24 to the service delivery duct 24'.

Each of the inlet ports 16, 17 . . . 22 is entirely surrounded by the cylindrical internal wall 15 of the casing, so that the rotor B can be fully sealed to the wall 15 around any selected inlet port.

In bottom section 10 of the casing is a counterbore 27 constituting a portion of sampling outlet 25. In cap 12 is a counterbore 28 which, together with bore 27, is coaxial with the rotor axis. Bore 27 and counterbore 28 have at their inner ends, shallow flat counterbores 29 disposed at the respective internal end walls 30 and 31 of the bottom section 10 and cap 12 respectively.

Mounted in counterbore 27 and bore 28 are a pair of opposed bearing bushings 32 and 33 having respective end flanges 34 and 35 projecting radially from their respective inner ends, and seated in the respective shallow counterbores 29.

Rotor B comprises a central body section 36 of generally cylindrical form having, at its respective ends, heads 37, 38 which bear against the end flanges 34, 35 of bearing bushings 32, 33 respectively. Projecting beyond heads 37, 38 are integral trunnions 39, 40, snugly fitted within the respective bearing bushings. Trunnion 39 is hollow, providing one end of the L-shaped transfer passage 41 and providing communication with sampling port 25. Trunnion 40 may be solid and is preferably formed as an integral, coaxial continuation of head 38, which is closed. Trunnion 40 is continued externally of the casing to provide a wrenching stem 42 which may have squared or hexagonal sides for cooperation with the wrench used for rotating the rotor B.

The material of bearing bushings 32, and 33 is Teflon (tri-fluoroethylene), a yielding, elastic, exceedingly tough material having exceptionally high wear characteristics and having the characteristic of slowly cold flowing under pressure so as to conform to surfaces pressing thereagainst. In the assembly of the valve, when the cap 12 is attached and cinched down tightly against peripheral section 11, flanges 34 and 35 are placed under light compression. This is provided for by observing close tolerances in the axial dimensions of the valve including the thicknesses of flanges 34 and 35, the distance between the end shoulders 43 and 44 respectively of heads 37 and 38, and the distances between the flat bottoms of shallow counterbores 29. Thereafter, fluid pressure acting against the peripheries of flanges 34 and 35 through the open spaces between heads 37, 38 and counterbores 29, will tend to thicken the flanges 34, 35 so as to maintain a fluid-tight seal between heads 37, 38 and the bottom and cap members 10 and 12 respectively. In such thickening and sealing operations, the cold flowing characteristics of the Teflon material are essential to the sealing result that is obtained.

Rotor B includes a lateral arm 45 terminating in a bell 46 in which there is a counterbore 47. Counterbore 47 constitutes an enlargement of a cylindrical intermediate bore 48 which, in turn, constitutes a continuation of a bore having an internal thread 49, the latter bore communicating directly with that end of L-passage 41 which projects radially outwardly.

Mounted in intermediate bore 48 is the skirt portion 50 of a tubular seal member having a head 51 in the general form of a radial flange extending radially outwardly from the outer end and fitted in counterbore 47 of skirt 50. Head 51 (Fig. 4) is of varying thickness at its periphery, its end face 52 being of segmental cylindrical curvature conforming to the curvature of cylindrical wall 15 of the casing. End face 52 of the seal seats snugly against cylindrical wall 15 to provide a fluid-tight sealing connection between the seal 50 and the peripheral section 11 of the casing. Skirt 50 is sealed to counterbore 48 by means of an O-ring 53 which is seated in an annular groove 54 in skirt 50.

Figure 2:
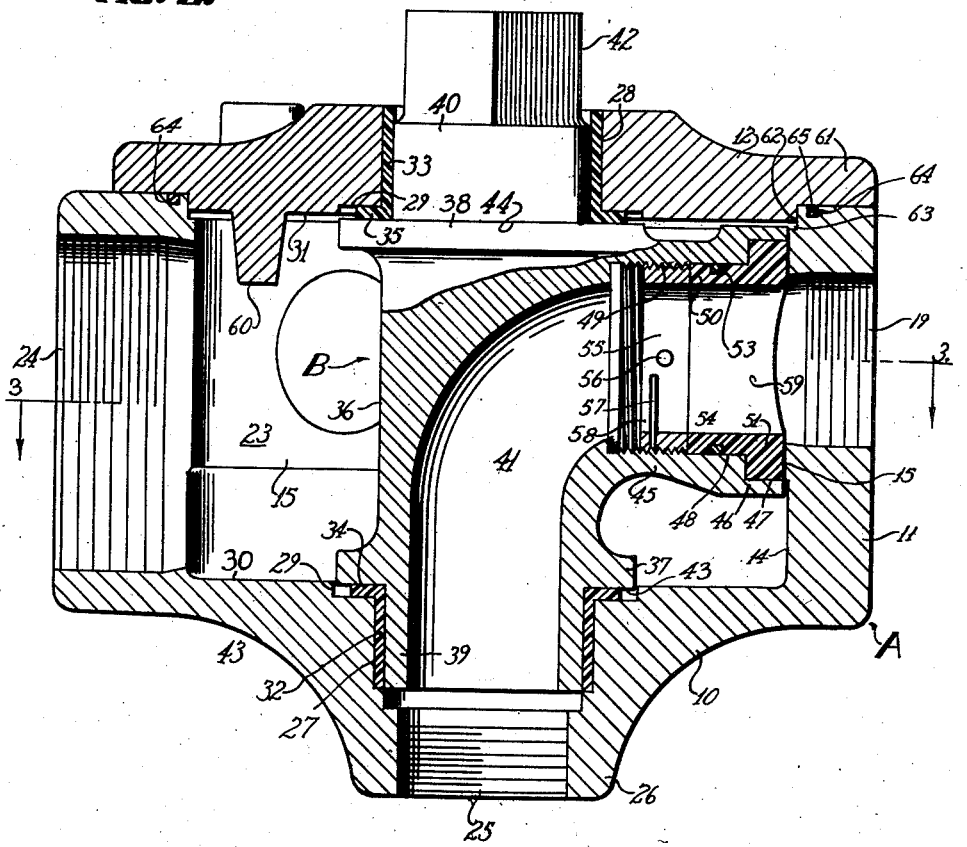
Fig. 2 is an axial sectional view thereof.

Seal 50, 51, is backed up by a threaded collar 55 which is threaded into the bore thread 49, whereby collar 55 provides an adjustable seat for the inner end of skirt 50. In collar 55 are a pair of diametrically opposed apertures 56 into which the prongs of a spanner wrench may be inserted for rotating the collar 55 to any selected position of adjustment. Collar 55 also preferably has a slot 57 extending, normally to its axis, through one side of the collar and terminating at points short of a diameter of the collar, as indicated in Fig. 2 which may be taken as showing exactly one-half of the slot 57. The section 58 of the collar which is thus partially separated from the body of the collar, may be deformed slightly in an axial direction, toward or away from its original normal position, whereby to function as a spring lock in the threads of collar 55 to prevent vibration induced rotation of the collar in the threads 49.

Seal member 50, 51 defines a receiving port 59 at the lateral extremity of passage 41. Receiving port 59 is arranged to communicate selectively with any one of the inlet ports 16, 17 . . . 22.

It may now be noted that when the rotor B is adjusted to bring its receiving port 59 into communication with any selected one of the inlet ports 16 . . . 22, that all of the remaining inlet ports are in direct communication with the common service outlet 24, whereas the selected inlet port (e. g. port 19 in Fig. 3) is cut off from the chamber 23 and is connected to the sampling outlet port 25.

The seal member 50, 51, like gaskets 34, 35, is of Teflon material and adapted to cold flow into snug seating engagement with the surfaces of counterbores 47, 48 and casing wall 15 so as to provide and maintain a good seal between the casing and the rotor under adverse conditions of wear, such as is caused by particles of fine sand, dirt, etc., carried in suspension in the flows of crude oil entering the valve from the lines 16' . . . 22'. Furthermore, the Teflon material has such an exceptionally high wear resistance that over an extended period of service, it does not lose its effectiveness to maintain a seal.

Furthermore, when the period of service has extended to the point where the seal commences to become somewhat loose, the seal can be tightened by the simple operation of detaching the large duct 24' from port 24, rotating rotor B to a position wherein arm 45 makes contact against a stop 60 on cap 12, and then inserting a spanner wrench through the ample space of port 24 and into receiving port 59, engaging the wrench in apertures 56, and rotating the collar 55 to advance it against the end of seal 50, 51 until the seal has been snugged up to wall 15 a satisfactory extent.

Stop 60 may be in the form of an integral lug projecting downwardly from cap 12. Cap 12 may have a peripheral portion of reduced thickness providing a flange 61 for seating against peripheral section 11 of the casing, and defining a shoulder 62 which enters a counterbore 63 at the upper extremity of lateral internal wall 14 in peripheral section 11. Thus, the cap 12 is piloted in accurate coaxiality of its bore 28 with counterbore 27. An O-ring gasket 65 is interposed between flange 61 and peripheral wall section 11, and is seated in an annular groove 64 in the latter.

I claim:

1. In a rotary gathering and sampling selector valve for merging all but a selected one of a multiplicity of inflows into a common service outflow while simultaneously segregating said one inflow and directing it separately through the valve to provide a sampling outflow, in combination: a casing having opposed interior end walls and an interior lateral wall cooperatively defining a valve chamber, having a cylindrical bearing wall constituting at least a portion of said lateral wall, having a rotor axis to which said cylindrical wall is concentric, having a multiplicity of radial inlet ports opening into said chamber through said cylindrical bearing wall and entirely surrounded thereby, having a relatively large radial service outlet port in said lateral wall, said outlet and inlet ports being spaced circumferentially about said lateral wall, and said casing having a sampling outlet port extending axially from one of said end walls, having a counterbore in the inner portion of said sampling outlet port, and having a valve stem bore extending axially from the other of said end walls, said bore and counterbore being in axially opposed relation, centered on said rotor axis and each having at its inner end a shallow flat counterbore disposed at the plane of the respective end wall; a pair of opposed gaskets of yieldable, resilient, wear resistant material, including respective cylindrical skirt portions in lining relation to said bore and counterbore respectively, and respective radial flanges projecting outwardly from the inner ends of the respective skirt portions and seated in said shallow flat counterbores respectively; a rotor of T-form, including a central body portion having axially opposed heads provided with respective end bearing shoulders seated against said radial flanges respectively and thereby sealed to the respective end walls of said casing, and including a lateral arm projecting radially from said central body and terminating in a bell having a radial bore including a counterbore portion at the outer end thereof, and said rotor having a transfer passage of L-form with one end thereof extending axially through one of said heads and communicating with said sampling outlet port, and with its other end joined to said bell bore, the other of said heads being closed, and said rotor further including an actuator stem integral with and projecting from said other head, journalled in the skirt of the adjoining gasket, and extending externally of the casing for actuation of the valve; said lateral arm having a female thread defining the inner portion of its said bore and a cylindrical bore wall defining the intermediate portion thereof; an annular seal of yieldable, resilient, wear resistant material defining in said rotor a receiving port adapted to selectively communicate with any one of said inlet ports, said seal including a cylindrical skirt portion received in said intermediate portion of the bell bore and sealed to said cylindrical bore wall thereof, and a head portion projecting radially outwardly from the outer end of said skirt portion and seated in said counterbore portion, said head portion having a segmental-cylindrical end face conforming to and seated against said cylindrical wall of the casing to seal said receiving port to the selected inlet port; and a loading collar threaded into said female thread and providing an adjustable seat for the inner end of said skirt portion of the seal, whereby said seal may be loaded under compression between said adjustable seat and said cylindrical bearing wall of the casing, to maintain a good seal.

2. In a rotary gathering and sampling selector valve for merging all but a selected one of a multiplicity of inflows into a common service outflow while simultaneously segregating said one inflow and directing it separately through the valve to provide a sampling outflow, in combination: a casing having opposed interior end walls and an interior lateral wall cooperatively defining a valve chamber, having a cylindrical bearing wall constituting at least a portion of said lateral wall, having a rotor axis to which said bearing wall is concentric, having a multiplicity of radial inlet ports opening into said chamber through said cylindrical bearing wall, having a relatively large radial service outlet port in said lateral wall, said outlet and inlet ports being spaced circumferentially about said lateral wall, and said casing having a sampling outlet port extending axially from one of said end walls, having a counterbore in the inner portion of said sampling outlet port, and having a valve stem bore extending axially from the other of said end walls, said bore and counterbore being centered on said rotor axis and each having at its inner end a shallow flat counterbore disposed at the plane of the respective end wall; a pair of opposed gaskets of yieldable, resilient, wear resistant material, including respective cylindrical skirt portions in lining relation to said bore and counterbore respectively, and respective radial flanges projecting outwardly from the inner ends of the respective skirt portions and seated in said shallow flat counterbores respectively; a rotor including a central body portion having axially opposed heads provided with respective end bearing shoulders seated against said radial flanges respectively and thereby sealed to the respective end walls of said casing, and including a lateral arm projecting radially from said central body and terminating in a bell having a radial bore including a counterbore portion at the outer end thereof, and said rotor having a transfer passage of L-form with one end thereof extending axially through one of said heads and communicating with said sampling outlet port, and with its other end joined to said bell bore, the other of said heads being closed, and said rotor further including an actuator stem projecting from said other head, journalled in the skirt of the adjoining gasket, and extending externally of the casing for actuation of the valve; said lateral arm having a female thread defining the inner portion of its said bore and a cylindrical bore wall defining the intermediate portion thereof; an annular seal of yieldable, resilient, wear resistant material defining in said rotor a receiving port adapted to selectively communicate with any one of said inlet ports, said seal including a cylindrical skirt portion received in said intermediate portion of the bell bore and sealed to said cylindrical bore wall thereof, and a head portion projecting radially outwardly from the outer end of said skirt portion and seated in said counterbore portion, said head portion having a segmental-cylindrical end face conforming to and seated against said cylindrical wall of the casing to seal said receiving port to the selected inlet port; and a loading collar threaded into said female thread and providing an adjustable seat for the inner end of said skirt portion of the seal, whereby said seal may be loaded under compression between said adjustable seat and said cylindrical bearing wall of the casing, to maintain a good seal.

3. In a rotary gathering and sampling selector valve for merging all but a selected one of a multiplicity of inflows into a common service outflow while simultaneously segregating said one inflow from said service outflow and directing it through the valve to provide a sampling outflow, in combination: a casing having opposed interior lateral and end walls cooperatively defining a valve chamber, providing a rotor axis to which said lateral wall is concentric, having a cylindrical bearing wall constituting at least a portion of said lateral wall, having a multiplicity of radial inlet ports opening into said chamber through said cylindrical bearing wall, having a relatively large radial service outlet port in said lateral wall, said outlet and inlet ports being spaced circumferentially about said lateral wall, and said casing having a sampling outlet port extending axially from one of said end walls, having a counterbore in the inner portion of said sampling outlet port, and having a valve stem bore extending axially from the other of said end walls, said bore and counterbore being centered on said rotor axis; a pair of opposed gasket bushings of yieldable, resilient, wear resistant material including respective cylindrical skirt portions in lining relation to said bore and counterbore respectively, and respective radial flanges projecting outwardly from the inner ends of the respective skirt portions and seated in said end walls; a rotor of T-form, including a central body portion having axially opposed heads provided with respective trunnions mounted in said gasket bushings, and with end bearing shoulders at the roots of said trunnions, seated against said radial flanges and thereby sealed to the respective end walls of said casing, and including a lateral arm projecting radially from said central body and terminating in a bell having a radial bore including a counterbore portion at the outer end thereof, and said rotor having a transfer passage of L-form with one end thereof extending axially through one of said trunnions and communicating with said sampling outlet port, and with its other end extending radially and joined to said bell bore, and said rotor further including an actuator stem integral with and projecting from the other trunnion externally of the casing for actuation of the valve; said lateral arm having a female thread defining the inner portion of its said bore and a cylindrical bore wall defining the intermediate portion thereof; an annular seal of yieldable, resilient, wear resistant material defining in said rotor a receiving port adapted to selectively communicate with any one of said inlet ports, said seal including a cylindrical skirt portion received in said intermediate portion of the bell bore and sealed to said cylindrical bore wall thereof, and a head portion projecting radially outwardly from the outer end of said skirt portion and seated in said counterbore portion, said head portion having a segmental-cylindrical end face conforming to and seated against said cylindrical wall of the casing to seal said receiving port to the selected inlet port; and a loading collar threaded into said female thread and providing an adjustable seat for the inner end of said skirt portion of the seal, whereby said seal may be loaded under compression between said adjustable seat and said cylindrical bearing wall of the casing, to maintain a good seal.

4. In a rotary gathering and sampling selector valve for merging all but a selected one of a multiplicity of inflows into a common service outflow while simultaneously segregating said one inflow from said service outflow and directing it through the valve to provide a sampling outflow, in combination: a casing having opposed interior lateral and end walls cooperatively defining a valve chamber, providing a rotor axis to which said lateral wall is concentric, having a cylindrical bearing wall constituting at least a portion of said lateral wall, having a multiplicity of radial inlet ports opening into said chamber through said cylindrical bearing wall, having a relatively large radial service outlet port in said lateral wall, said outlet and inlet ports being spaced circumferentially about said lateral wall, and said casing having a sampling outlet port extending axially from one of said end walls, having a counterbore in the inner portion of said sampling port, and having a valve stem bore extending axially from the other of said end walls, said bore and counterbore being centered on said rotor axis; a pair of opposed gaskets concentric with said bore and counterbore respectively, a rotor of T-form, including a central body portion having axially opposed heads provided with respective trunnions extending through said gaskets and journalled in said bore and counterbore, and with end bearing shoulders at the roots of said trunnions, seated against said gaskets and thereby sealed to the respective end walls of said casing, and including a lateral arm projecting radially from said central body and terminating in a bell having a radial bore, and said rotor having a transfer passage of L-form with one end thereof extending axially through one of said trunnions and communicating with said sampling outlet port, and with its other end joined to said bell bore, the other of said trunnions being closed, and said rotor further including an actuator means on the other trunnion, exposed externally of the casing for actuation of the valve; said lateral arm having a female thread defining the inner portion of its said bore and a cylindrical bore wall defining the intermediate portion thereof; an annular seal of yieldable, resilient, wear resistant material defining in said rotor a receiving port adapted to selectively communicate with any one of said inlet ports, said seal including a cylindrical skirt portion received in said intermediate portion of the bell bore, and a head portion projecting radially outwardly from the outer end of said skirt portion, said head portion having a segmental-cylindrical end face conforming to and seated against said cylindrical wall of the casing to seal said receiving port to the selected inlet port; and a loading collar threaded into said female thread and providing an adjustable seat for the inner end of said skirt portion of the seal, whereby said seal may be loaded under compression between said adjustable seat and said cylindrical bearing wall of the casing, to maintain a good seal.

5. In a rotary gathering and sampling selector valve for merging all but a selected one of a multiplicity of inflows into a common service outflow while simultaneously segregating said one inflow and directing it separately through the valve to provide a sampling outflow, in combination: a casing defining a valve chamber having a cylindrical bearing wall and a rotor axis to which said bearing wall is concentric, having a multiplicity of circumferentially spaced radial inlet ports opening into said chamber through said cylindrical bearing wall, and a relatively large radial service outlet port, having a sampling outlet port on said axis, having a counterbore in the inner portion of said sampling outlet port, and having a valve stem bore on said axis extending in axially opposed relation to said counterbore; a rotor including a central body portion having at its ends trunnions journalled in said bore and counterbore and sealed to said casing, and including a lateral arm projecting radially from said central body and terminating in a bell having a radial bore including a counterbore portion at the outer end thereof, and said rotor having a transfer passage of L-form with one end thereof extending axially through one of said trunnions and communicating with said sampling outlet port, and with its other end extending radially and joined to said bell bore, and said rotor further including an actuator means on the other trunnion, accessible externally of the casing for actuation of the valve; said lateral arm having a female thread defining the inner portion of its said bore and a cylindrical bore wall defining the intermediate portion thereof; an annular seal of yieldable, resilient, wear resistant material defining in said rotor a receiving port adapted to selectively communicate with any one of said inlet ports, said seal including a cylindrical skirt portion received in said intermediate portion of the bell bore and sealed to said cylindrical bore wall thereof, and a head portion projecting radially outwardly from the outer end of said skirt portion and seated in said counterbore portion, said head portion having a segmental-cylindrical end face conforming to and seated against said cylindrical wall of the casing to seal said receiving port to the selected inlet port; and a loading collar threaded into said female thread and providing an adjustable seat for the inner end of said skirt portion of the seal, whereby said seal may be loaded under compression between said adjustable seat and said cylindrical bearing wall of the casing, to maintain a good seal.

6. A valve as defined in claim 5, wherein said seal is of trifluoroethylene material.

7. A valve as defined in claim 5, wherein said seal skirt is provided with an external annular groove, and including an O-ring seated in said groove and engaged under compression between the bottom of said groove and said cylindrical bore wall.

8. A valve as defined in claim 5, wherein said loading collar has a pair of diametrically opposed recesses for engagement of said collar by wrenching means inserted thereinto through said receiving port.

9. In a rotary gathering and sampling selector valve for merging all but a selected one of a multiplicity of inflows into a common service outflow while simultaneously segregating said one inflow from said service outflow and directing it through the valve to provide a sampling outflow, in combination: a casing having opposed interior lateral and end walls cooperatively defining a valve chamber, providing a rotor axis to which said lateral wall is concentric, having a cylindrical bearing wall constituting at least a portion of said lateral wall, having a multiplicity of radial inlet ports opening into said chamber through said cylindrical bearing wall, having a relatively large radial service outlet port in said lateral wall, said outlet and inlet ports being spaced circumferentially about said lateral wall, and said casing having a sampling outlet port extending axially from one of said end walls, having a counterbore in the inner portion of said sampling outlet port, and having a valve stem bore extending axially from the other of said end walls, said bore and counterbore being centered on said rotor axis and each having at its inner end a shallow flat counterbore disposed at the plane of the respective end wall; a pair of opposed gasket bushings of yieldable, resilient, wear resistant tri-fluoroethylene material, in lining relation to said bore and counterbore respectively, and having respective radial flanges projecting outwardly from the inner ends thereof and seated in said shallow flat counterbores respectively; a rotor of T-form, including a central body portion having axially opposed heads provided with respective trunnions mounted in said gasket bushings, and with end bearing shoulders at the roots of said trunnions, seated against said radial flanges and thereby sealed to the respective end walls of said casing, and including a lateral arm projecting radially from said central body and terminating in a bell having a radial bore including a counterbore portion at the outer end thereof, and said rotor having a transfer passage of L-form with one end thereof extending axially through one of said trunnions and communicating with said sampling outlet port, and with its other end extending radially and joined to said bell bore, the other of said trunnions being closed, and said rotor further including actuator means on said other trunnion, accessible externally of the casing for actuation of the valve; an annular seal of yieldable, resilient, wear resistant tri-fluoroethylene material defining in said rotor a receiving port adapted to selectively communicate with any one of said inlet ports, said seal including a cylindrical skirt portion received in said bell bore and sealed to wall thereof, and a head portion projecting radially outwardly from the outer end of said skirt portion and seated in said counterbore portion, said head portion having a segmental-cylindrical end face conforming to and seated against said cylindrical wall of the casing to seal said receiving port to the selected inlet port; and a loading means in said rotor providing an adjustable seat for the inner end of said skirt portion of the seal, whereby said seal may be loaded under compression between said adjustable seat and said cylindrical bearing wall of the casing, to maintain a good seal.

References Cited in the file of this patent

UNITED STATES PATENTS

| | | |
|---|---|---|
| 825,370 | Zurbuch | July 10, 1906 |
| 1,791,923 | Eule | Feb. 10, 1931 |
| 2,696,967 | Wilson et al | Dec. 14, 1954 |